United States Patent [19]

Cole et al.

[11] Patent Number: 4,485,011

[45] Date of Patent: Nov. 27, 1984

[54] FUEL CONTAMINATION MONITOR WITH A SHUT OFF VALVE

[75] Inventors: Larry T. Cole, Mt. Clemens; Anthony D. Simone; Ting C. Tao, both of Troy, all of Mich.

[73] Assignee: Facet Enterprises, Inc., Tulsa, Okla.

[21] Appl. No.: 508,894

[22] Filed: Jun. 28, 1983

Related U.S. Application Data

[63] Continuation of Ser. No. 335,500, Dec. 30, 1981, abandoned.

[51] Int. Cl.³ .............................................. B01D 27/10
[52] U.S. Cl. .................................. 210/96.1; 210/100; 210/489
[58] Field of Search ............... 210/96.1, 100, 489–491, 210/DIG. 10

[56] References Cited

U.S. PATENT DOCUMENTS

| | | | |
|---|---|---|---|
| 2,421,705 | 6/1947 | Kasten | 210/96.1 |
| 2,701,062 | 2/1955 | Robinson | 210/DIG. 5 |
| 2,730,241 | 1/1956 | Thomas | 210/165 |
| 2,864,505 | 12/1958 | Kasten | 210/315 |
| 2,914,179 | 4/1959 | Foust | 210/323 |
| 3,117,925 | 1/1964 | Kasten | 210/96.1 |
| 3,329,276 | 7/1967 | Mouwen | 210/489 X |
| 3,339,734 | 9/1967 | Kasten | 210/96.1 |
| 3,339,735 | 9/1967 | Kasten | 210/100 |
| 3,357,560 | 12/1967 | Raupp | 210/96.1 |
| 3,406,827 | 10/1968 | Todal et al. | 210/96.1 |
| 3,416,665 | 12/1968 | Kasten | 210/96.1 |
| 3,416,666 | 12/1968 | Kasten | 210/96.1 |
| 3,434,486 | 3/1969 | Kasten | 210/96.1 |
| 3,478,881 | 11/1969 | Bozek | 210/493 X |
| 3,503,507 | 3/1970 | Raupp et al. | 210/96.1 |
| 3,506,475 | 4/1970 | MacDonnell | 210/493 X |
| 3,528,546 | 9/1970 | McPherson | 210/489 X |
| 4,145,285 | 3/1979 | Martin et al. | 210/100 |
| 4,242,206 | 12/1980 | Estabrooke | 210/489 |

*Primary Examiner*—John Adee
*Attorney, Agent, or Firm*—Remy J. VanOphem

[57] ABSTRACT

A fuel contamination monitor for separating particulate and liquid contaminants from a liquid fuel is disclosed. The fuel contamination monitor has an inner and outer fluid pervious wall forming a cavity therebetween. A tubular filtering element consisting of a plurality of fluid filtering media layers is mounted in the cavity. The plurality of fluid filtering media layers includes an outer layer of particulate matter separating filter media and a layer of superabsorbing media adjacent to the outer layer. The superabsorbing media is backed by a layer of paper media and an inner layer of screen material. The interior of the inner fluid pervious wall communicates with a liquid fuel outlet port. A shut-off valve is provided which interrupts the flow of liquid fuel through the fuel contamination monitor in the event that the media becomes contaminated before effective contaminant separation.

23 Claims, 6 Drawing Figures

FUEL CONTAMINATION MONITOR WITH A SHUT OFF VALVE

This is a continuation of application Ser. No. 335,500, filed Dec. 30, 1981, now abandoned.

BACKGROUND OF THE INVENTION

1. Field of the Invention

The present invention relates to liquid purification separation devices, and more particularly, to a device for separating particulate and liquid contaminants from a liquid fuel having a liquid pressure responsive cut off mechanism.

2. Description of the Prior Art

While most fuel used in aircraft is subject to stringent quality standards at the refinery, present storage and refueling equipment can contaminate the high quality fuel with solid and water contaminants. This contamination of the fuel can occur even though efficient filtration and water separating equipment is installed and utilized whenever fuel is transferred from one point to another. Thus, there is no guarantee that each aircraft which has been refueled has acceptable fuel under all conditions and after each refueling.

All filter water separator units are equipped with some type of coalescer and filter separator elements which prevent solid and water contaminants contained in the fuel from being discharged from the separator unit. In so doing, the elements gradually offer increased resistance to fuel flow, due to the retention of contaminants on the surface until the pressure drop through the element becomes greater than the element's strength. If the element is not replaced before this occurs, it will rupture and discharge into the aircraft fuel tank a large amount of solid and water contaminants. Such contaminants in the fuel could prove disastrous, since normal airborne filters are designed to remove only small traces of solid contaminants and no water. In addition, large amounts of contaminants will quickly plug up these airborne filters thus causing the bypass valves in the filter to open. The contaminated unfiltered fuel may then wear out pumps prematurely and plug up the fluid passage in the engine fuel control. Furthermore, any water in the fuel might freeze in the fuel passages and thereby cause an engine flame-out which can endanger life and property.

Almost all of the currently used filter elements have a burst or rupture resistance between 10 psi and 75 psi with the normal range being between 10 to 25 psi. To prevent rupturing of the filter element, it is necessary to replace these elements before a critical pressure is reached. However, the average operator using current refueling equipment cannot be certain when to perform periodic maintenance to change the elements.

Some prior art fuel systems use monitoring devices located downstream of water separators and particulate matter separators. One such device is disclosed in U.S. Pat. No. 3,117,925 to Walter Kasten, issued Jan. 14, 1964, owned by the assignee of the present patent application. In this device, the monitor element includes a porous tubular member which consists of a first series of washer like elements having a relatively smooth surface and a second series of washer like elements having a relatively rough surface. The first and second series of washer like elements are placed in a stack in alternating sequence. The porous tubular member or fuse element is located within a perforated tube and is placed under a calibrated precompression by a spring member. When traces of water in excess of a predetermined level pass through the filter water separator, the washers swell thereby tending to decrease the pore sizes between the washers. In addition, when solid contaminants above a predetermined size pass through the filter, the solid contaminants block some of the pores in the washers. The filter element senses this contamination by causing an increase in pressure drop across the unit. Another example of such a filter element is shown in U.S. Pat. No. 3,182,800 to Kasten and Landree, issued May 11, 1965, also owned by the assignee of the present patent application.

In some installations, fuel monitoring devices of the type described above are located downstream of conventional filter water separators. In such installations, the fuel monitoring devices will normally operate for long periods of time without being exposed to large amounts of contamination. During such normal operations, the pressure drop through the fuel monitoring device will build up gradually, and the fuse elements must be replaced after a scheduled time interval, for example, six months or when the pressure differential across the fuse elements reaches a predetermined value, that is, 15 to 20 psi. Under such conditions, the fuse elements of the fuel monitoring device will trap and retain all or most all of the solid and water contaminants in the fuel flowing therethrough.

More recently, however, in many installations, fuel monitoring devices have been effectively utilized in place of filter water separators rather than in combination therewith. Even in such installations, if the fuel is of average quality, that is, contains relatively small quantities of water and solid contamination, the fuse elements will have no difficulty in retaining or trapping the contamination. However, in such installations, under limited fuel flow or low fuel pumping pressure operation, conditions can occur which may permit small quantities of water and submicron size particles to seep between the layers of the sandwich media construction and flow to the outlet port of the device. The reason for this is that the construction of the device does not provide for a sufficient compressive force on the sandwich media construction to effectively close off the inner face between the layers of separating media to preclude the passage of submicron size particles and water therethrough.

Still other prior art fuel systems utilize a fuel monitoring device incorporating a particulate separating media which to some degree separates and absorbs fuel-borne liquid and solid contaminants and beyond this point the device is permitted to pass liquid contaminants downstream. When the contamination level of the downstream effluent reaches a sufficiently high level, it will cause a trigger to be released which will shut off flow through the device. Examples of such devices are shown in U.S. Pat. No. 3,339,734 and U.S. Pat. No. 3,339,735 issued to Walter Kasten on Sept. 5, 1967; U.S. Pat. No. 3,416,665 and U.S. Pat. No. 3,416,666 issued to Walter Kasten on Dec. 17, 1968; U.S. Pat. No. 3,434,486 issued to Walter Kasten on Mar. 25, 1969; U.S. Pat. No. 3,357,560 issued to R. J. Raupp on Dec. 12, 1967; U.S. Pat. No. 3,478,881 issued to J. W. Bozek on Nov. 18, 1969 and U.S. Pat. No. 3,503,507 to Raupp et al on Mar. 31, 1970, all owned by the assignee of the present patent application. These devices sense both liquid and solid contamination which effect the positive shut off of the fuel flow.

Finally, in U.S. Pat. No. 4,145,285 issued Mar. 20, 1979 to William G. Martin and Anthony D. Simone, also owned by the assignee of the present patent application, a fuel monitoring and filtering unit is disclosed which shuts off continued fuel flow when either its capacity to separate particulate contaminants or its capacity to separate liquid contaminants from the fuel has diminished to a predetermined level. However, this type of fuel monitoring device has limited water holding capacity which significantly affects its life span.

Therefore, there exists a need for a fuel monitoring and filtering unit which separates both liquid and sub micronic particulate fuel flowing liquid contaminants, which operates under conditions of limited fuel flow and low fuel flow pumping pressure without allowing water seepage, which shuts off continued fuel flow when its capacity to separate particulate contaminants or its capacity to separate liquid contaminants from the fuel has diminished to a predetermined level and which has increased water holding capacity so as to improve the life of the device in operation.

SUMMARY OF THE INVENTION

The present invention is directed to a fuel contamination monitoring unit which separates out fuel-borne liquid contamination, prevents water seepage therethrough and separates out fuel-borne submicroscopic particulate contaminants. In addition, the unit provides for a fuel flow cut-off when the capacity of the device to effectively separate water or particulate contaminants from the fuel is diminished and provides for increased water holding capacity so as to extend its life in use.

More particularly, the present invention provides a fuel filtering unit including a housing having an outer fluid pervious wall for the ingress of fluid therethrough and an outlet port for the egress of the fluid therethrough. An inner fluid pervious wall is disposed within the housing for the passing of the fluid therethrough. The inner fluid pervious wall has one end adjacent to and in alignment with the outlet port and an opposite end remote from the one end. The inner and outer fluid pervious walls further form an annular cavity therebetween. A tubular filtering element is disposed within the annular cavity and permits fluid flow therethrough from the outside to the inside of the tubular filtering element. The tubular filtering element is in alignment with the outlet port. The tubular element has a first end adjacent the outlet port and a second end opposite the first end and adjacent to the opposite end of the inner fluid pervious wall. A predetermined axial compression force is placed on the tubular filtering element. In addition, a valve mechanism is disposed at the second end of the tubular filtering element which normally closes the second end of the tubular filtering element to the passage of fluid. The valve mechanism has one side exposed to fluid pressure inside the tubular filter element and the other side exposed to fluid pressure outside of the husing. Thus, when a predetermined pressure drop occurs across the valve mechanism, the valve mechanism opens the second end of the tubular filtering element and closes the outlet port of the housing to prevent further fluid flow through the fluid filtering unit.

It is therefore a primary object of the present invention to provide a fuel contamination monitor unit which separates out fuel-borne liquid and submicronic particulate contaminants, provides for a fuel flow cut off when the capacity of the device to effectively separate out water or particulate contaminants for the fuel is diminished and which provides increased water holding capacity to extend the life of the unit.

It is yet still a further object of the present invention to provide a fuel contamination unit construction which incorporates a tubular filtering element construction so as to provide extended life and surface area for separating contaminants from the fuel.

Other objects and advantages of the invention will become apparent upon reading the following detailed description and upon reference to the drawings which are appended hereto.

BRIEF DESCRIPTION OF THE DRAWINGS

A better understanding of the present invention will be had upon reference to the following detailed description when read in conjunction with the accompanying drawings, wherein like reference characteristics refer to like parts throughout the several views, and in which.

DETAILED DESCRIPTION OF THE PREFERRED EMBODIMENT

Figure 1:
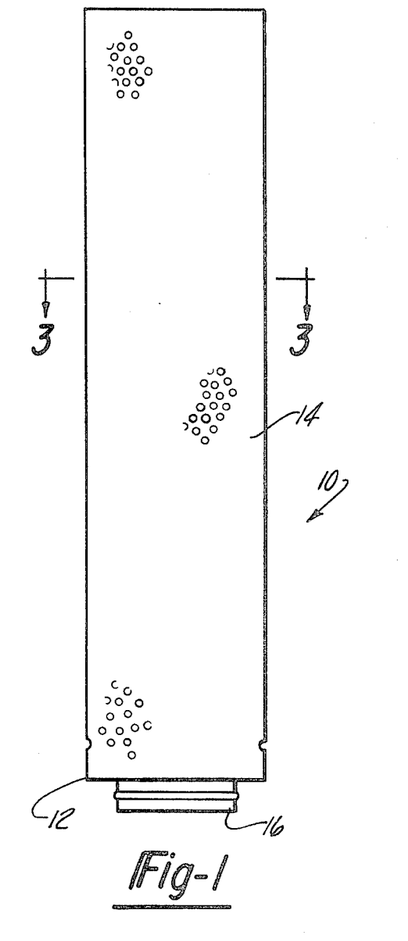
FIG. 1 is a side view of a filter device of the preferred embodiment.

Referring to FIG. 1, a fluid separator or fuel filter device is generally designated by the numeral 10. The fuel filter device 10 has a housing 12 with an outer fluid pervious wall 14 and a fluid outlet port 16. The fluid to be processed passes from the exterior of the fuel filter device 10 to its interior through the outer fluid pervious wall 14 and, after processing, passes out the fuel filter device 10 to the outlet port 16. Preferably, the housing 12 is cylindrical in shape and the outlet port 16 is formed at one end thereof. The outer fluid pervious wall 14 is preferably formed from a perforated aluminum material. In the alternative, the outer fluid pervious wall 14 may be formed of an aluminum sheet with a plurality of apertures formed or drilled therein.

Figure 2:
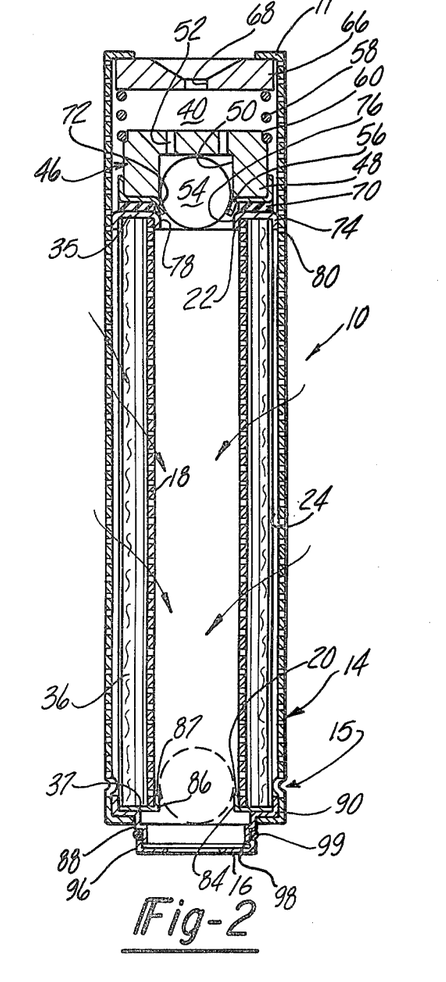
FIG. 2 is a longitudinal sectional view of the filter device of FIG. 1.
Figure 3:
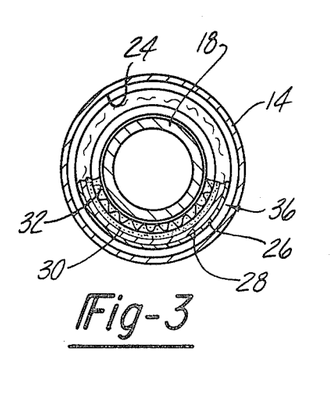
FIG. 3 is a transverse partially cut away cross sectional view taken along lines 3—3 in FIG. 1.
Figure 4:
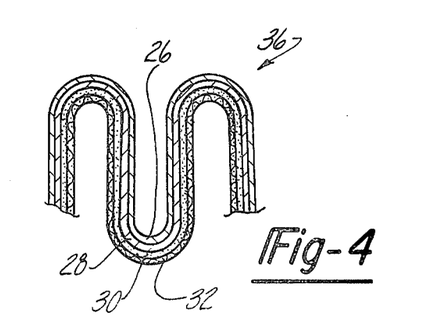
FIG. 4 is an enlarged sectional view of the tubular filter element according to a first alternate embodiment of the present invention.

As can be best seen in FIGS. 2 through 4, the fuel filter device 10 further includes an inner fluid pervious wall 18 which is coaxially disposed in the housing. The inner fluid pervious wall 18 has one end 20 which is adjacent to and in alignment with the outlet port 16. The inner fluid pervious wall 18 also has an opposite end 22 which is disposed adjacent to but spaced away from the one end 20 of the housing 12. The inner fluid pervious wall 18 is preferably a layer of perforated plastic or, in the alternative perforated aluminum or steel which adds structural strength to the housing 12 while still allowing the fluid to pass through it.

It should be noted that the preferred shape of the fuel filter device 10 is cylindrical because this provides a continuous wall through which the fluid may pass. In addition, a cylindrical shape is preferred because it is inherently structurally strong. Because of the cylindrical shape of the housing 12, the outer fluid pervious wall 14 and the inner fluid pervious wall 18 are also cylindrical and are concentrically disposed one to another in the housing 12. Thus, the inner and outer fluid pervious walls 18 and 14, respectively, form an annular cavity 24 therebetween in the housing 12.

A tubular filtering element 36 is disposed in the annular cavity 24. The tubular filtering element 36 has a plurality of layers 26, 28, 30 and 32. The layers, as illustrated in FIGS. 3 and 4, include a first interior layer 32 disposed in confronting abutting relationship to a second layer 30 which in turn is disposed in confronting abutting relationship to a third layer 28 and finally a fourth or outer layer 26 is disposed in confronting abutting relationship to the third layer 28. The first interior layer 32 is a layer of mesh screen used for drainage purposes. The mesh screen is preferably wire or in the alternative, fiberglass. The second layer 30 is a paper media which is preferably just fine enough so as to prevent media migration and bursting. The third layer is capable of absorbing liquid contaminants. In practice, a suitable material from which to form the third layer 28 is an absorbent cellulosic polymer sold under the tradename CLD-2 by the Buckeye Cellulose Corporation of Memphis, Tenn., or any similar material. Finally, the fourth or outer layer is capable of separating submicron particulate material from the fluid. For example, a suitable filter media material has been found to be a fiberglass media with fine depth media.

The tubular filtering element 36 has the same axial length as the inner fluid pervious wall 18, thus the tubular filtering element 36 has a first end 37 which is adjacent to the outlet port 16. In addition, the tubular filtering element 36 has a second end 35 which is adjacent to the opposite end 22 of the inner fluid pervious wall 18. Preferably the tubular filtering element 36 is in the form of a simple cylinder.

A first end cap 74, having an aperture 76 formed therethrough, is mounted to the second end 35 of the tubular filtering element 36 and the opposite end 22 of the inner fluid pervious wall 18. The first end cap 74 further has a first longitudinally extending portion 78 which is in abutting relationship to the inner fluid pervious wall 18 and a second longitudinally extending portion 80 which is in abutting relationship to the outer fluid pervious wall 14. The first and second longitudinally extending portions 78 and 80, respectively act as diametral spacers to hold the inner fluid pervious wall 18 away from the outer fluid pervious wall 14. Similarly, a second end cap 87, having an aperture 84 formed therethrough, is contiguous to the one end 20 of the inner fluid pervious wall 18 and the first end 37 of the tubular filtering element 36. However, the second end cap 87 only has a first longitudinally extending portion 86 which is in abutting relationship to the inner fluid pervious wall 18. Adjacent to the second end cap 87 is a third end cap 88 which has a longitudinally extending portion 90 which is in abutting relationship to the outer fluid pervious wall 14 and is connected thereto by means of a crimp 15 in the outer fluid pervious wall 14 so as to abut against the end of the longitudinally extending portion 90 of the third end cap 88. In addition, the third end cap 88 and the second end cap 87 are connected to the housing 12 by radially rolling the end of the outer fluid pervious wall 14 over the third end cap 88 at the crimp 15. The third end cap 88 may, for example, have a nipple like portion 96 with an O-ring groove 98 with O-ring 99 seal therein adjacent the outlet port 16 of the housing. The O-ring 99 seals against an aperture (not shown) in the fuel separator housing (not shown). The second end cap 87 and the first longitudinal extending portion 86 form an appropriate valve stop for a purpose to be described herein later.

An end closure member 66, having an aperture 68 formed therethrough, is connected to the one end 11 of the housing outer fluid pervious wall 14.

A fluid chamber 40 is defined within the housing 12 between the one end 11 and an annular gasket member 70. The chamber 40 is open at its one end to the aperture 68 in the end closure member 66 thus placing the chamber 40 in fluid communication with the ambient fluid surrounding the outside of the housing 12.

A valve means 46 includes a valve retaining member 48 sandwiched in the fluid chamber 40 between the one end of the fluid chamber 40 and the annular gasket member 70. The valve retaining member 48 defines a ball socket 50 in general alignment with the interior of the tubular filtering element 36. In addition, the valve retaining member 48 has at least one fluid aperture 52 to establish a fluid passageway between the chamber 40 and the interior of the tubular filtering element 36 across the valve means. A detachable valve member in the form of a ball 54 is detachably received within the ball socket 50 to seal the fluid aperture 52. The ball 54 is detachably held in the ball socket 50 to normally seal or close the fluid aperture 52 by means of a deformable ball retaining flange 56. The ball retaining flange 56 is attached to the valve retaining member 48 and extends radially inwardly of the ball socket 50 at the open side of the socket. Thus, the valve means 46 has one side exposed to fluid pressure interior of the inner fluid pervious wall 18 of the tubular filtering element 36 and the other side exposed to the fluid pressure outside the housing 12 by means of the chamber 40. Thus, when a predetermined pressure drop occurs across the valve means 46, the differential pressure communicated to the ball 54 through the fluid aperture 52 will exert a force against the ball 54 greater than the force exerted on the ball by the ball retaining flange 56. This force moves the ball 54 out of the socket 50 past the ball retaining flange 56 and drives it against the second end cap 87, which acts as a valve stop or seat 86 to shut off further fluid flow out of the outlet port 16 in the housing 12. Those skilled in the art will recognize that the ball diameter 50 is of such size smaller than the inner diameter of the inner fluid pervious wall 18 but is larger than the aperture 84 so that the ball will not move past the second end cap 87.

An axial compressive force is exerted on the inner fluid pervious wall 18 through the annular gasket member 70 by means of, for example, a preloaded coil spring member 58 generally coaxially disposed with the tubular filtering element 36. In addition, the coil spring member 58 is generally coaxially disposed with the outer fluid pervious wall 14 within the chamber 40. The coil spring member 58 is disposed in a state of axial compression between the end closure member 66 at one end 11 of the housing 12 and a circumferential groove 60 formed adjacent to the top end of the valve retaining member 48. This arrangement places the annular gasket member 70 under compression to provide a seal between the valve means 46 and the first end cap 74. Thus, the first end cap 74 transmits this compressive force against the second end of the tubular filtering element 36.

As indicated by the flow arrows in FIG. 2, the liquid fuel to be filtered passes generally radially inwardly of the housing 12 through the outer fluid pervious wall 14.

Next, the liquid fuel flows into the annular cavity 24, through the layers 26, 28, 30 and 32 of the tubular filtering element 36, that is, through the fourth or outer layer 26, through the third layer 28, through the second layer 30 and finally through the first interior layer 32 and in doing so particulate matter contaminants, both liquid and solid, are separated from the liquid fuel. The liquid fuel, which is now clean of particulate contaminants, is prevented from passing from the interior of the inner fluid pervious wall 18 to the chamber 40 by the ball 54 which is seated in the ball socket 50. At the same time, liquid fuel which enters into the chamber 40 through the aperture 68 in the end closure member 66 passes out of the chamber 40 through the outer fluid pervious walls 14 since passage into the interior of the inner fluid pervious wall 18 is prevented by the valve means 46 and the annular gasket member 70 being compressed by the coil spring member 58.

As the liquid fuel passes through the fourth or outer layer 26, particulate matter contaminants separated from the fuel first accumulate on the exterior of the fourth or outer layer 26 until its capacity to effectively separate particulate contaminants is diminished or it otherwise becomes blocked with separated particulate matter. Next, the liquid fuel now clean of the particulate contaminants, passes through the third layer 28 which absorbs liquid contaminants, such as water, as the liquid fuel passes therethrough. Then, the liquid fuel, now clean of particulate contaminants and liquid contaminants, passes through the second layer 30 and the first interior layer 32 of the tubular filtering element 36 and passes through the inner fluid pervious wall 18 into the interior thereof. The second layer 30 prevents media migration whereas the first interior layer 32 provides structural support to the second, third and fourth layers. The now clean fuel passes out of the fuel contamination monitor unit, through the outlet port 16 to be conveyed to a fuel user (not shown) such as an engine or fuel reservoir.

The present invention also contemplates a first alternate embodiment, as shown in FIG. 4, which is the same as the preferred embodiment wherein like numerals designate like elements except that the tubular filtering element 36 is pleated. The pleats provide an extended surface area upon which to separate water from the fuel and to accumulate separated fuel-borne contaminants thereon. This extended area enhances the life of the fuel filter device 10.

Figures 5, 6:
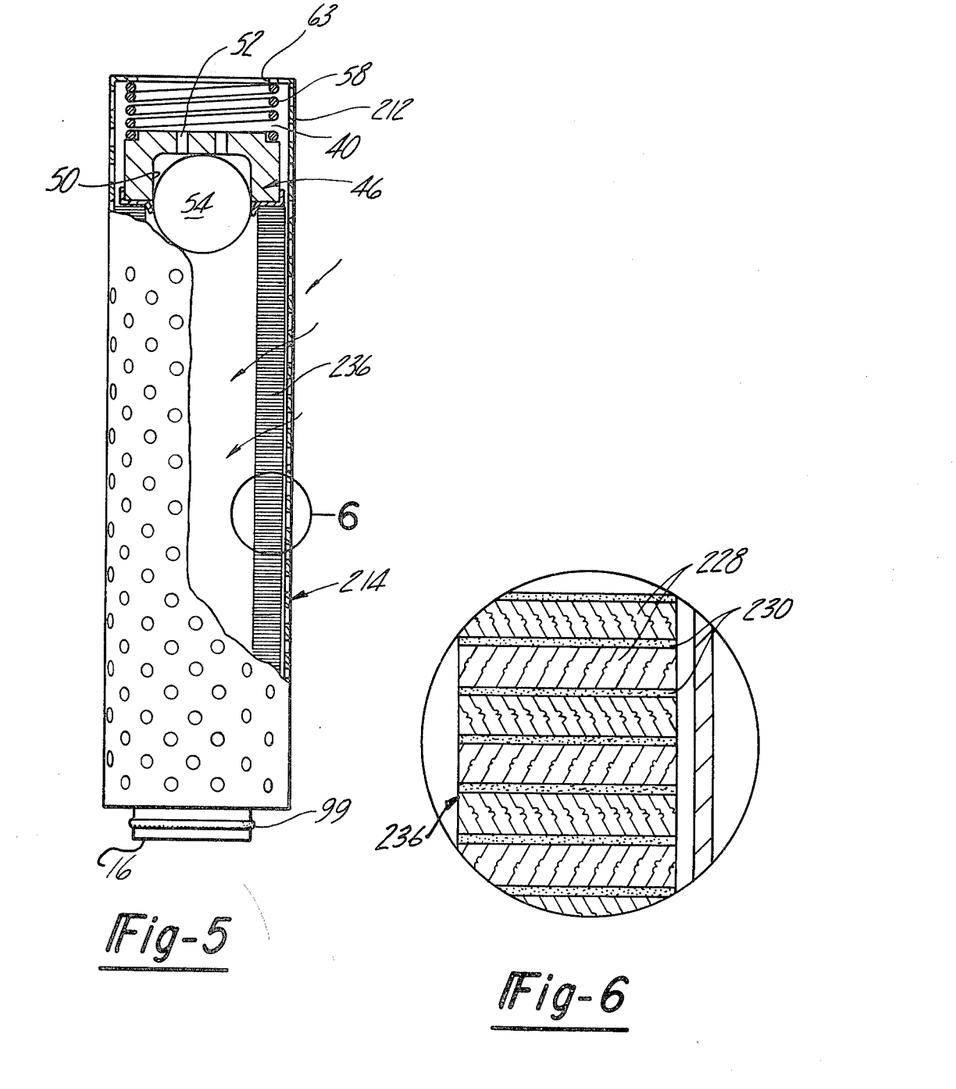
FIG. 5 is an elevated view with parts cutaway of a second alternate embodiment.
FIG. 6 is an enlarged view in the circle of FIG. 5.

A second alternate embodiment is shown in FIGS. 5 and 6 wherein the tubular filtering element 236 is formed of a plurality of washer shaped disc elements in alternate face to face contact with an absorbent paper sandwiched in between adjacent discs. The disc elements are arranged so that fluid flow through the tubular filtering element 236 is radial through the inner faces between the discs and absorbent paper. The tubular filtering element has a plurality of cellulosic discs 228 formed of an absorbent cellulosic polymer previously described in the preferred embodiment with a plurality of discs of absorbent paper discs 230 in an alternate arrangement.

Each of the cellulosic discs 228 and each of the paper discs 230 are preferably placed in alternating sequence, that is, each of the cellulosic discs 228 are placed in face to face contact with each of the paper discs 230. Thus the discs 228 and 230 form a tubular filtering element 236.

The tubular filtering element 236 is inserted into the housing 212 adjacent the outer fluid pervious wall 214. In this second alternate embodiment, the inner fluid pervious wall 18 of the preferred embodiment has been eliminated from the filter device.

A calibrated axially compressible force by means of the spring means 58 is exerted on the valve member 46 which is thus transmitted to the the tubular filtering element 236. However, as the tubular filtering element 236 absorbs water, the tubular filtering element 236 expands axially against the force exerted by the spring member 58. Optionally, the inner diameter of the tubular filtering element 236 is coated with an epoxy resin solution by the process described in U.S. Pat. No. 3,117,925 which is incorporated herein by reference. The resin coating is applied to the discs to prevent media migration in certain applications.

As indicated by the flow arrows in FIG. 5, the fuel to be filtered passes generally radially inwardly of the housing 212 through the outer fluid pervious wall 214, and into the space between the outer fluid pervious wall 214 and the tubular filtering element 236, the liquid fuel having passed through the outer fluid pervious wall 214 into the chamber 40. Concurrently, liquid fuel also passes through the aperture 63 and into the chamber 40. The liquid fuel in the chamber 40 is prevented from passing out of the chamber 40 through the apertures 52 by the ball 54 which is seated in the ball socket 50. The liquid fuel now radially passes from the space between the tubular filtering element 236 and the outer fluid pervious wall 214 through the walls of the tubular filtering element 236. The tubular filtering element 236 will absorb liquid contaminants, such as water, in the fuel as it passes through the walls of the tubular filtering element radially into the interior of the tubular filtering element. The now clean fuel passes out of the fuel contamination monitor device through the outlet port 16 to be conveyed to a fuel user (not shown) such as an engine or fuel reservoir.

Particulate matter contaminants separated from the fuel will eventually accumulate on the outer periphery of the tubular filtering element 236, and will restrict flow through the tubular filtering element 236. Likewise, water separated by the tubular filtering element 236 will eventually cause it to swell to a point where its ability to absorb further amounts of water is detrimentally affected and further liquid fuel flow through the tubular filtering element will be restricted. When either situation occurs, the fuel pressure inside the chamber 40 will exceed the fuel pressure inside the tubular filtering element 236, and when a predetermined fuel pressure differential has been reached, the ball 54 will be ejected from the ball socket 50 and driven onto the valve seat 86 thereby blocking the outlet port 16 and shutting off further liquid fuel flow through the tubular filtering element. At this point, the blocked fuel contamination monitor device is removed and replaced with another fresh fuel contamination monitor device.

In the preferred embodiment of FIGS. 1 through 3, the particulate matter contaminants separated from the fuel eventually accumulate on the exterior of the outer layer 26. Likewise, water separated by the third layer 28 of the tubular filtering element will eventually cause the tubular filtering element 36 to swell to a point where its ability to absorb further amounts of water is detrimentally affected and further liquid fuel flow through the tubular filtering element will be restricted. When either situation occurs, the fuel pressure inside the chamber 40 will exceed the fuel pressure inside the inner fluid pervious wall 18. Thus, when a predetermined fuel pressure differential has been reached between from the exterior of the housing 12 to the interior of the inner fluid pervious wall 18, the ball 54 will be ejected from the ball socket 50 and driven onto the second end cap 87, acting as a valve stop. This blocks the flow through the outlet port 16, thereby shutting off further liquid fuel flow through the outlet port 16. At this point, the blocked fuel contamination monitor device is removed and replaced with another fresh fuel contamination monitor device. Thus, the valve means 46 will close the outlet port 16 shutting off fuel flow through the fuel contamination device when the pressure drop across the tubular filtering element exceeds a predetermined amount whether that predetermined pressure drop is as a result of only water absorption or only particulate contaminant accumulation or a combination of both of these undesirable contaminants. In addition, the inner fluid pervious wall 18 provides further structural strength to the tubular filtering element 36 so that as the tubular filtering element 36 becomes contaminated and the pressure drop across the tubular filtering element 36 rises the inner fluid pervious wall 18 prevents premature collapse or localized failure of the tubular filtering element 36 before the predetermined fuel pressure differential is exceeded.

While the invention has been described in connection with a preferred embodiment, it will be understood that it is not intended to limit the invention to that embodiment. On the contrary, it is intended to cover all alternatives, modifications and equivalents as may be included in the spirit and scope of the invention as defined by the appended claims.

What is claimed is:

1. A filtering device for filtering contaminants from a fluid flowing therethrough, and for selectively preventing fluid flow therethrough when said filtering device has filtered a predetermined amount of contaminants, said filtering device comprising:
   a housing having an outer fluid pervious wall for the ingress of said fluid into said housing and an outlet port for the egress of said fluid therefrom;
   an inner fluid pervious wall disposed coaxially within said outer fluid pervious wall for the passing of said fluid therethrough, said inner fluid pervious wall having one end adjacent to and in alignment with said outlet port and an opposite end remote from said one end;
   an annular cavity between said inner fluid pervious wall and said outer fluid pervious wall;
   tubular filtering means, disposed in said annular cavity between said outer fluid pervious wall and said inner fluid pervious wall, for filtering solid particulate and liquid contaminants from said fluid, said tubular filtering means extending axially in said housing and having a first end adjacent said outlet port and a second end adjacent said opposite end of said inner fluid pervious wall; and
   valve means, mounted adjacent to said second end of said tubular filtering means, for normally closing said second end of said tubular filtering means to the passage of said fluid, said valve means having one side exposed to fluid pressure inside said inner fluid pervious wall and an other side opposite said one side and exposed to the fluid pressure outside of said housing so that when a predetermined pressure drop occurs across said valve means, said valve means opens said second end of said tubular filtering element and closes said outlet port of said housing, thereby preventing further fluid flow through said outlet port of said filtering device, said valve means further comprising:
   a valve retaining member disposed within said outer fluid pervious wall and abutting against said opposite end of said inner fluid pervious wall; and
   a valve member detachably retained in a first closed position by said valve retaining member;
   a valve seat adjacent said outlet port for said valve member for selectively closing said outlet port; and
   biasing means interposed said housing and said valve retaining member placing a predetermined axial compressive force on said inner fluid pervious wall;
   whereby when said predetermined pressure drop occurs across said valve means, said valve member is caused to detach from said retaining member and to coact with said valve seat adjacent to said outlet port and, thereby, to close said outlet port.

2. The filtering of claim 1, wherein said tubular filtering means further comprises:
   a tubular filtering element having a plurality of fluid media layers in abutting relationship to one another.

3. The filtering device of claim 1, wherein said tubular filtering means has a plurality of axially extending pleats.

4. The filtering device of claim 2, wherein said plurality of fluid media layers further comprises:
   an interior layer disposed adjacent but spaced away from said inner fluid pervious wall and comprised of a mesh screen;
   a second layer disposed contiguous to said interior layer and comprised of thin paper;
   a third layer disposed contiguous to said second layer and comprised of absorbent cellulosic polymer; and
   an outer layer disposed contiguous to said third layer and adjacent but spaced away from said outer fluid pervious wall and comprised of fiberglass.

5. The filtering device of claim 2, wherein said tubular filtering means further comprises a plurality of fluid media layers in contiguous relationship to one another.

6. The filtering device of claim 1, further comprising a flange formed in said outer fluid pervious wall and further wherein said biasing means comprises a preloaded helical spring member in abutment with said valve retaining means and said flange.

7. The filtering device of claim 2, wherein one of said layers of filtering media is a fiberglass screen material.

8. The filtering device of claim 2, wherein one of said layers is a superabsorbing media for absorbing liquid contaminants from said fluid.

9. The filtering device of claim 2, wherein one of said layers is a paper media.

10. The filtering device of claim 2, wherein one of said layers is wire mesh material.

11. The filtering device of claim 1, wherein said valve retaining member further comprises:
    a socket having an open side;
    at least one fluid aperture through the wall of said socket opposite said open side, said valve member being a ball removably received within said socket to seal said at least one aperture; and a deformable ball retaining member adjacent to said socket and releasably contacting said ball at said open side of said socket to releasably hold said ball in said socket.

12. The filtering device of claim 1 wherein said tubular filtering element is formed of a plurality of apertured disc shaped elements stacked in face to face contact.

13. The filtering device of claim 1 further comprising:
a shoulder formed in said outer fluid pervious wall and spaced a predetermined distance from said outlet port;
a first annular end cap abutting said one end of said inner fluid pervious wall and abutting said shoulder of said outer fluid pervious wall such that said shoulder and said end cap prevent the movement of said inner fluid pervious wall towards said outlet port beyond a predetermined position within said outer fluid pervious wall; and
a second annular end cap interposed said inner fluid pervious wall and said valve retaining member and abutting said other end of said inner fluid pervious wall and the inner surface of said outer fluid pervious wall.

14. The filtering device of claim 1 further comprising a resilient annular member interposed said valve retaining member and said inner fluid pervious wall, said resilient annular member detachably retaining said valve member in said valve retaining member.

15. The filtering device of claim 1 further comprising:
an annular end cap interposed said inner fluid pervious wall and said valve member and abutting said other end of said inner fluid pervious wall and the inner surface of said outer fluid pervious wall;
a resilient annular member interposed said annular end cap and said inner fluid pervious wall, said resilient annular member detachably retaining said valve member in said valve retaining member; and
gasket means interposed said end cap and said resilient annular member, said biasing means placing said annular end cap and said resilient annular member under said predetermined axial compressive force.

16. A filtering device for filtering contaminants from a fluid flowing therethrough, and for selectively preventing fluid flow therethrough when said filtering device has filtered a predetermined amount of said contaminants, said filtering device comprising:
a housing having an outer fluid pervious wall for the ingress of said fluid into said housing and an outlet port for the egress of said fluid therefrom;
a flange formed in said other end of said outer fluid pervious wall opposite said outlet port;
an inner fluid pervious wall disposed coaxially within said outer fluid pervious wall for the passing of said fluid therethrough, said inner fluid pervious wall having one end adjacent to and in alignment with said outlet port and an opposite end remote from said one end;
an annular cavity between said inner fluid pervious wall and said outer fluid pervious wall;
tubular filtering means, disposed in said annular cavity between said outer fluid pervious wall and said inner fluid pervious wall, for filtering solid particulate and liquid contaminants from said fluid, said filtering means extending axially in said housing and having a first end adjacent said outlet port and a second end adjacent to said opposite end of said inner fluid pervious wall; and valve means, mounted adjacent to said second end of said tubular filtering means, for normally closing said second end of said tubular filtering means to the passage of said fluid, said valve means having one side exposed to fluid pressure inside said inner fluid pervious wall and an other side opposite said one side and exposed to the fluid pressure outside of said housing so that when a predetermined pressure drop occurs across said valve means, said valve means opens said second end of said tubular filtering element and closes said outlet port of said housing thereby preventing further fluid flow through said outlet port of said filtering device, said valve means further comprising:
a valve retaining member disposed within said outer fluid pervious wall and abutting against said opposite end of said inner fluid pervious wall; and
a socket formed in said valve retaining member said socket having an open side;
at least one fluid aperture to the wall of said socket opposite said open side;
a spherical valve member detachably retained in a first closed position in said socket of said valve retaining member to seal said at least one aperture;
a valve seat adjacent said outlet port for said spherical valve member for selectively closing said outlet port;
biasing means interposed said housing and said retaining member placing a predetermined axial compressive force on said inner fluid pervious wall;
an annular end cap interposed said inner fluid pervious wall and said spherical valve member and abutting said other end of said inner fluid pervious wall and the inner surface of said outer fluid pervious wall;
a resilient annular member interposed said annular end cap and said inner fluid pervious wall, said resilient member detachably retaining said spherical valve member in said valve retaining member; and
gasket means interposed said end cap and said resilient annular member, said biasing means placing said annular end cap and said resilient annular member under said predetermined axial compressive force;
whereby said predetermined pressure drop occurs across said valve means and whereby said spherical valve member is caused to detach from said valve retaining member and to coact with said valve seat adjacent to said outlet port and, thereby, to close said outlet port.

17. The filtering device of claim 16 wherein said filtering means further comprises a tubular filtering element having a plurality of fluid media layers in abutting relationship to one another, said plurality of fluid media layers comprising:
an interior layer disposed adjacent but spaced away from said inner fluid pervious wall and comprised of a mesh screen;
a second layer disposed contiguous to said interior layer and comprised of thin paper;
a third layer disposed contiguous to said second layer and comprised of absorbent cellulosic polymer; and an outer layer disposed contiguous to said third layer and adjacent but spaced away from said outer fluid pervious wall and comprised of fiberglass.

18. The filtering device of claim 16, further comprising a flange formed in said other end of said outer fluid pervious wall and further wherein said biasing means comprises a preloaded helical spring member in abutment with said valve retaining means and said flange.

19. The filtering device of claim 16 further comprising:
  a shoulder formed in said outer fluid pervious wall and spaced a predetermined distance from said outlet port; and
  a second annular end cap abutting said one end of said inner fluid pervious wall and abutting said shoulder of said outer fluid pervious wall such that said shoulder and said second annular end cap prevent the movement of said inner fluid pervious wall towards said outlet beyond a predetermined position within said outer fluid pervious wall.

20. A filtering device for filtering contaminants from a fluid flowing therethrough, and for selectively preventing fluid flow therethrough when said filtering device has filtered a predetermined amount of said contaminants, said filtering device comprising:
  a housing having an outer fluid pervious wall for the ingress of said fluid into said housing and an outlet port for the egress of said fluid therefrom;
  an inner fluid pervious wall disposed coaxially within said outer fluid pervious wall for the passing of said fluid therethrough, said inner fluid pervious wall having one end adjacent to and in alignment with said outlet port and an opposite end remote from said one end;
  an annular cavity between said inner fluid pervious wall and said outer fluid pervious wall;
  tubular filtering means, disposed in said annular cavity between said outer fluid pervious wall and said inner fluid pervious wall, for filtering solid particulate and liquid contaminants from said fluid, said tubular filtering means extending axially in said housing and having a first end adjacent said outlet port and a second end adjacent to said opposite end of said inner fluid pervious wall, said tubular filtering means comprising a tubular filtering element having a plurality of fluid media layers in abutting relationship to each other, said layers comprising:
    (a) an interior layer disposed adjacent but spaced away from said inner fluid pervious wall and comprised of a mesh screen;
    (b) a second layer disposed contiguous to said interior layer and comprised of thin paper;
    (c) a third layer disposed contiguous to said second layer and comprised of absorbent cellulosic polymer;
    (d) an outer layer disposed contiguous to said third layer and adjacent but spaced away from said outer fluid pervious wall and comprised of fiberglass;
  valve means, mounted adjacent to said second end of said tubular filtering means, for normally closing said second end of said tubular filtering means to the passage of said fluid, said valve means having one side exposed to fluid pressure inside said inner fluid pervious wall and an other side opposite said one side and exposed to the fluid pressure outside of said housing so that when a predetermined pressure drop occurs across said valve means, said valve means opens said second end of said tubular filtering element and closes said outlet port of said housing thereby preventing further fluid flow through said outlet port of said filtering device, said valve means further comprising:
    (a) a valve retaining member disposed within said outer fluid pervious wall and abutting against said opposite end of said inner fluid pervious wall; and
    (b) a socket formed in said valve retaining member said socket having an open side;
    (c) at least one fluid aperture to the wall of said socket opposite said open side;
    (d) a spherical valve member detachably retained in a first closed position in said socket of said valve retaining member;
    (e) a valve seat adjacent said outlet port for said spherical valve member for selectively closing said outlet port;
    (f) biasing means interposed said housing and said retaining member placing a predetermined axial compressive force on said inner fluid pervious wall, said biasing means further comprising a preloaded helical spring member in abutment with said valve retaining member and said flange;
    (g) a first annular end cap interposed said inner fluid pervious wall and said spherical valve member and abutting said other end of said inner fluid pervious wall and the inner surface of said outer fluid pervious wall;
    (h) a shoulder formed in said outer fluid pervious wall and spaced a predetermined distance from said outlet port;
    (i) a second annular end cap abutting said one end of said inner fluid pervious wall and abutting said shoulder of said outer fluid pervious wall such that said shoulder and said second annular end cap prevent the movement of said inner fluid pervious wall towards said outlet beyond a predetermined position within said outer fluid pervious wall;
    (j) a resilient annular member interposed said first annular end cap and said inner fluid pervious wall, said resilient member detachably retaining said spherical valve member in said valve retaining member; and
    (k) gasket means interposed said first annular end cap and said resilient annular member, said biasing means placing said first annular end cap and said resilient annular member under said predetermined axial compressive force;
  whereby said predetermined pressure drop occurs across said valve means and whereby said spherical valve member is caused to detach from said valve retaining member and to coact with said valve seat adjacent to said outlet port and, thereby, to close said outlet port.

21. The filtering device of claim 20, wherein said tubular filtering element has a plurality of axially extending pleats.

22. The filtering device of claim 20, wherein each of said annular end caps is comprised of a metallic stamping.

23. The filtering device of claim 20, wherein said valve seat is formed in said second annular end cap.

* * * * *

UNITED STATES PATENT AND TRADEMARK OFFICE
CERTIFICATE OF CORRECTION

PATENT NO. : 4,485,011

DATED : November 27, 1984

INVENTOR(S) : Larry T. Cole, et al.

It is certified that error appears in the above-identified patent and that said Letters Patent is hereby corrected as shown below:

Column 3, line 59, delete "husing" and insert ---- housing ----.

Column 4, line 29, delete "elevated" and insert ---- elevational ----.

Signed and Sealed this

Thirtieth Day of April 1985

[SEAL]

Attest:

DONALD J. QUIGG

Attesting Officer

Acting Commissioner of Patents and Trademarks